Jan. 25, 1955  E. B. LOWE  2,700,268
TREE VIBRATING APPARATUS
Filed May 26, 1953  2 Sheets-Sheet 1
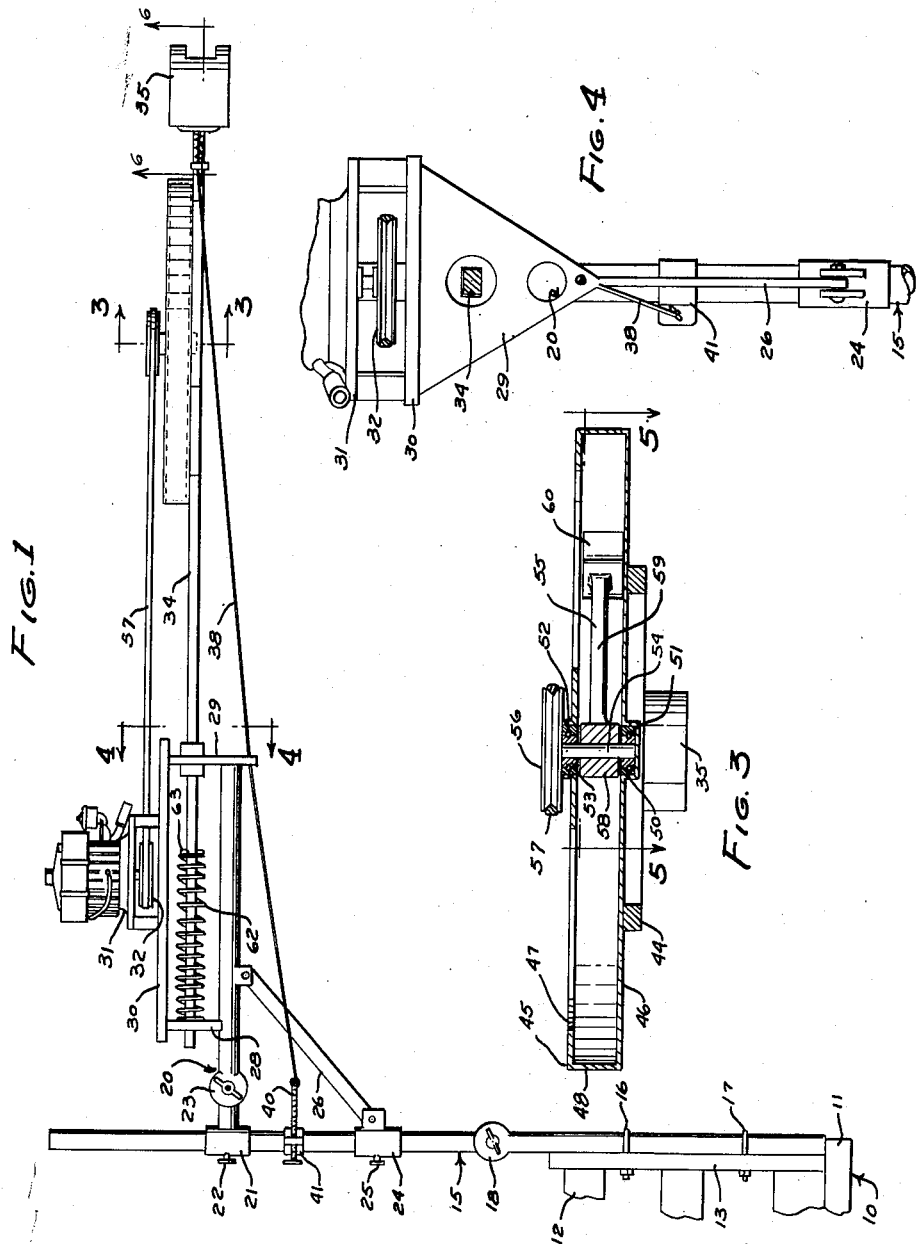
INVENTOR.
EDISON B. LOWE
BY
McMorrow, Berman & Davidson
ATTORNEYS Jan. 25, 1955 — E. B. LOWE — 2,700,268
TREE VIBRATING APPARATUS
Filed May 26, 1953 — 2 Sheets-Sheet 2
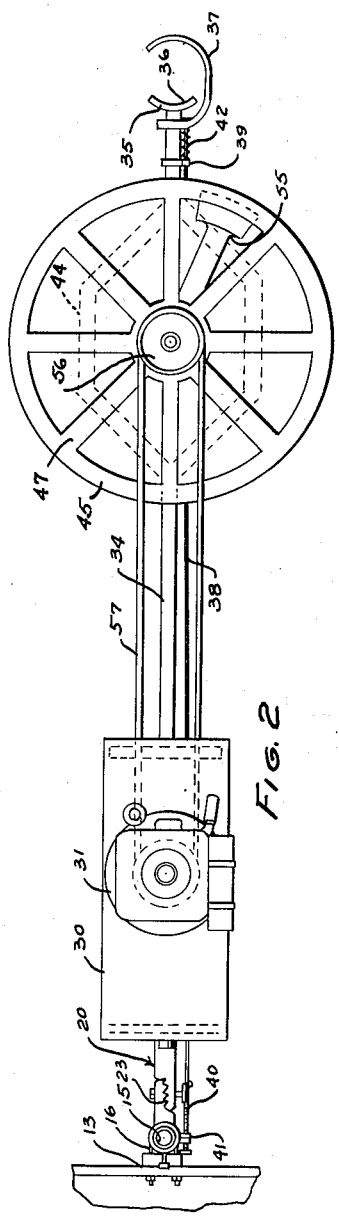
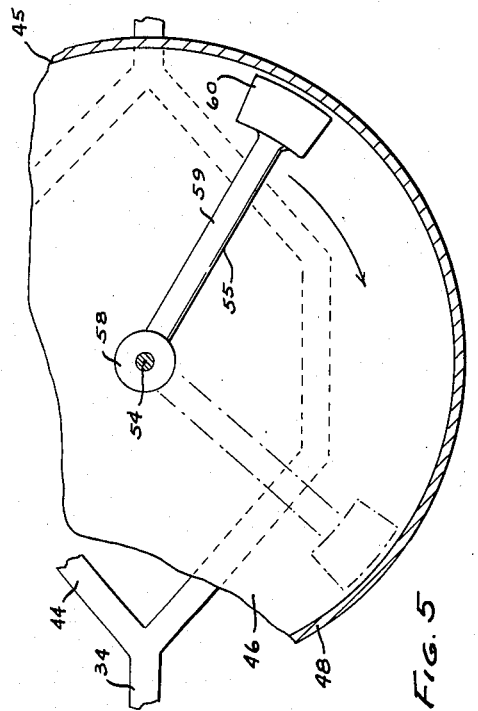
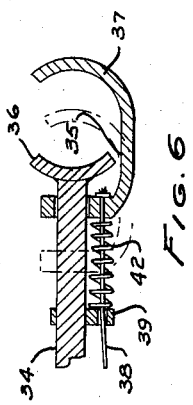
INVENTOR.
EDISON B. LOWE
BY
McMorrow, Berman & Davidson
ATTORNEYS United States Patent Office 2,700,268
Patented Jan. 25, 1955

2,700,268

TREE VIBRATING APPARATUS

Edison B. Lowe, Arlington, Va.

Application May 26, 1953, Serial No. 357,460

3 Claims. (Cl. 56—328)

This invention relates to tree vibrating apparatus and more particularly to power driven apparatus for shaking or vibrating fruit or nut trees to dislodge the fruit or nuts therefrom.

It is among the objects of the invention to provide an improved tree vibrating mechanism or apparatus which can be detachably mounted on a vehicle bed or body for transportation from place to place; which is effective to firmly grasp a tree trunk or limb and vibrate the tree or tree limb without injury to the tree to dislodge fruit or nuts from the tree; which is power operated and includes its own power plant; which can be moved in both vertical and horizontal directions relative to the supporting vehicle to facilitate engaging the mechanism with a tree; and which is simple and durable in construction, economical to manufacture, easy to use, and effective and efficient in operation.

Other objects and advantages will become apparent from a consideration of the following description and the appended claims in conjunction with the accompanying drawings, wherein:

Figure 1 is a side elevational view of a tree vibrating mechanism illustrative of the invention;

Figure 2 is a top plan view of the vibrating mechanism illustrated in Figure 1;

Figure 3 is an enlarged transverse cross sectional view on an enlarged scale on the line 3—3 of Figure 1;

Figure 4 is an enlarged transverse cross sectional view on an enlarged scale on the line 4—4 of Figure 1; and Figure 5 is a fragmentary cross sectional view on the line 5—5 of Figure 3;

Figure 6 is an enlarged sectional view taken along line 6—6 of Figure 1.

With continued reference to the drawings, the numeral 10 generally indicates a fragmentary portion of a vehicle, such as a portion of the bed or body of a truck or farm wagon and includes a floor structure 11, a side structure 12 and an end structure or gate 13.

The tree vibrating mechanism comprises a tubular post, generally indicated at 15, mounted in substantially vertical position on the tail gate or end structure 13 of the vehicle body by suitable means, such as U bolts 16 and 17 which surround the post at spaced apart locations therealong and extend through apertures in the structure 13. One end of the post rests on the upper surface of the rearwardly projecting floor structure 11 of the vehicle body and the post is provided substantially at its mid-length location with a manually adjustable, pivotal joint 18 the axis of which is disposed substantially perpendicular to a plane which includes the longitudinal center line of the post and is disposed parallel to the longitudinal center line of the associated vehicle.

A tubular arm, generally indicated at 20, is mounted on the post 15 above the pivotal joint 18 and has at one end thereof a sleeve 21 which slidably receives the upper portion of the post. A manually operated set screw 22 is threaded through a tapped hole in the sleeve 21 and engages the adjacent portion of the post 15 to secure the sleeve at selected positions of adjustment longitudinally of the post. The arm 20 has its longitudinal center line substantially in a plane which includes the longitudinal center line of the post 15 and is provided at a location adjacent the sleeve 21 with a pivotal joint 23 the axis of which is substantially perpendicular to the plane including the longitudinal center lines of the post and the arm.

A second sleeve 24 receives the post 15 between the sleeve 21 and the pivotal joint 18 and is provided with a set screw 25 by means of which the sleeve 24 can also be secured at selected positions of adjustment longitudinally of the post. A diagonal brace 26 is pivotally secured at one end to the arm 20 at a location spaced from the side of the pivotal joint 23 remote from the sleeve 21 and is pivotally secured at its other end to the sleeve 24 so that the portion of the arm 20 outwardly of the pivotal joint 23 can be secured at selected positions of inclination relative to the post 15 by securing the sleeve 24 to the post at the properly selected positions longitudinally of the post.

Brackets 28 and 29 are secured to the arm 20 at spaced apart locations along the portion of this arm disposed outwardly of the pivotal joint 23 and extend transversely of the arm in spaced apart and substantially parallel relationship to each other. A platform 30 is mounted on the brackets 28 and 29 at the edges of these brackets remote from the arm 20 and is preferably disposed above and substantially parallel to the arm. A power plant 31, such as a small gasoline engine, is mounted on the platform 30 at the outer side of the platform and is provided with a belt pulley 32 for driving the vibrating mechanism in a manner to be presently described.

An elongated rod 34, preferably of rectangular cross sectional shape, is slidably received in mutually aligned apertures in the brackets 28 and 29 and extends outwardly of the end of the arm 20 remote from the post 15. A tree clamp 35 is mounted on the end of the rod 34 remote from the post and includes a yoke formation 36 on the outer end of the rod and a C-shaped member 37 slidably mounted at one end on the rod 34 and having its other end overlying the yoke formation 36 to clamp a tree trunk or tree limb against the yoke formation. A tension member 38 is connected at one end to the member 37 of the clamp and extends through an apertured lug 39 on the arm 34 adjacent the clamp and along the rod to a location adjacent the post 15 where it is connected to a screw shaft 40 threaded through a tapped hole in a bracket 41 mounted on the post 15 between the sleeves 21 and 24. By rotating the screw shaft 40 in the proper direction the outer end of the clamp member 37 can be moved toward the yoke formation 36 to clamp a tree trunk or branch against the yoke formation and by rotating the screw shaft in the opposite direction the pull on the member 37 is relieved. A compression spring 42 disposed between the clamp member 37 and the lug 39 moves the outer end of the clamp member 37 away from the yoke formation 36 when the tension on the member 38 is relieved by rotation of the screw shaft 40 in the proper direction.

Intermediate its length the rod 34 is provided with an enlargement 44 of hexagonal shape comprising lateral extensions extending symmetrically to respectively opposite sides of the rod. A flat housing 45 of substantially circular shape is mounted on the rod extendsion 44 and has flat, substantially parallel bottom and top walls 46 and 47 and an annular side wall 48. The bottom wall of the housing is secured to the top of the rod enlargement 44 and is provided with a centrally located bearing receptacle formation 50 in which is disposed an antifriction bearing 51. The top wall 47 of the housing is provided with a centrally located bearing receiving boss 52 receiving an antifriction bearing 53 and a shaft 54 extends through and is journaled in the bearings 51 and 53. An eccentric rotor 55 is disposed within the housing 45 and mounted on the shaft 54 for rotation by this shaft and a belt pulley 56 is mounted on the upper end of the shaft 54. A belt 57 drivingly connects the belt pulley 32 of the engine 31 to the belt pulley 56 so that the engine can drive the eccentric rotor 55 at a sufficient rate of speed to apply a strong vibration or shaking effect to the clamp 35.

The rotor 55 is shown as a hub 58 surrounding the shaft 54, a spoke 59 extending radially from the hub and a weight 60 on the outer end of the spoke but it is to be understood that this rotor may comprise an unbalanced wheel centrally mounted on the shaft 54, a balanced wheel eccentrically mounted on the shaft or any other desired form of rotor capable of producing a vibrational effect when rotated about the axis of the shaft 54.

The rod 34 being slidable through the brackets 28 and 29 and being laterally flexible to a limited extent, the vibrational effects created by the rotor 55 are not imparted to the motor base including the brackets 28 and 29 and the platform 30. In order to maintain the rod 34 at the proper longitudinal position relative to the arm 20, a compression spring 62 surrounds the rod 34 between the brackets 28 and 29 and bears at one end against the inner side of the bracket 28 and an abutment pin 63 extends transversely through the rod 34 and bears against the other end of the spring.

With the above described arrangement and with the vibrating apparatus mounted on a vehicle bed or body, as described, the vibrating apparatus may be easily transported to the location of a tree from which the fruit is to be harvested, the clamp 35 there connected to the trunk or to a limb of the three, the engine 31 placed in operation and the tree or tree limb thus mechanically vibrated until the fruit is dislodged therefrom.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Tree vibrating apparatus comprising a post adapted to be rigidly mounted in substantially vertical position on a vehicle and having intermediate its length a pivotal joint the axis of which is substantially perpendicular to the longitudinal center line of said post, an arm connected at one end to the portion of said post above said pivotal joint for movements of adjustment longitudinally of said post and having its center line substantially in a plane perpendicular to the axis of said pivotal joint and including the longitudinal center line of said post, said arm having adjacent said one end thereof a pivotal joint the axis of which is disposed substantially perpendicular to said plane, a brace pivotally connected at one end to said arm outwardly of the pivotal joint therein and adjustably connected at its other end to said post for securing the outer portion of said arm in selected positions of inclination relative to said post, brackets mounted on said arm at locations spaced apart along the portion of said arm at the side of the pivotal joint therein remote from said post, a power plant mounted on said brackets, a rod extending slidably through said brackets and beyond the end of said arm remote from said post, a tree clamp secured on the end of said rod remote from said post, clamp operating means mounted on said post and connected to said clamp, an eccentric rotor journaled on said rod intermediate the length of the rod, means drivingly connecting said power plant to said rotor, and spring means connected between said rod and said arm resiliently holding said rod in position relative to said arm.

2. Tree vibrating apparatus comprising a post, an arm connected at one end to said post for movements of adjustment longitudinally of said post, a rod arranged longitudinally of said arm and connected adjacent one end to said arm for longitudinal sliding movement, a tree clamp on the other end of said rod, clamp operating means mounted on said post and connected to said clamp, a power plant carried by said arm, an eccentric rotor journaled on said rod intermediate its ends, and means drivingly connecting said power plant to said rotor.

3. Tree vibrating apparatus comprising a post, an arm connected at one end to said post for movements of adjustment longitudinally of said post, a rod arranged longitudinally of said arm and connected adjacent one end of said arm for longitudinal sliding movement, a tree clamp on the other end of said rod, clamp operating means mounted on said post and connected to said clamp, a power plant carried by said arm, an eccentric rotor journaled on said rod intermediate its ends, means drivingly connecting said power plant to said rotor, and spring means connected between said rod and said arm resiliently holding said rod in position relative to said arm.

References Cited in the file of this patent

UNITED STATES PATENTS

| | | |
|---|---|---|
| 1,472,262 | Abildgaard | Oct. 30, 1923 |
| 2,159,311 | Berger | May 23, 1939 |